June 17, 1941.    H. T. KRAFT    2,245,791
BRAKING OR FRICTION DEVICE
Filed April 22, 1937

INVENTOR
*Herman T. Kraft*
BY
*Evans & McCoy*
ATTORNEYS

Patented June 17, 1941

2,245,791

UNITED STATES PATENT OFFICE 2,245,791

BRAKING OR FRICTION DEVICE

Herman T. Kraft, Akron, Ohio, assignor to The General Tire & Rubber Company, Akron, Ohio, a corporation of Ohio Application April 22, 1937, Serial No. 138,290

6 Claims. (Cl. 188—152)

This invention relates to a method and means for resisting relative rotational movement of members about a common axis and more particularly to a method and means of this character in which the members are arranged to frictionally engage one another to co-operate in resisting relative rotational movement.

It is an object of the present invention to provide a construction in which a deformable element having an internal chamber is arranged to receive a fluid under pressure thereby deforming the member and causing it to frictionally engage another member whereby relative rotational movement between the two members is resisted.

Another object is to provide a construction in which a rotatably mounted member is provided with a cylindrical friction surface concentric with its axis of rotation and another member is provided with a deformable friction element having a cylindrical face concentric with the rotational axis of the first member and in which a chamber within the deformable friction element is arranged to receive a fluid under pressure so as to deform the element and cause the face thereof to frictionally engage the friction surface of the first member and resist relative rotational movement between the members.

A more specific object is to provide a brake for a wheel in which a deformable friction element having a face concentric with the rotational axis of the wheel is formed with an internal chamber so that upon application of fluid pressure to the chamber the friction element is deformed to cause its face to frictionally engage a cylindrical friction surface carried by the wheel, thereby resisting rotation of the wheel.

A still further object is to provide a device for resisting relative rotational movement between members which is simple in design and construction and inexpensive to manufacture and which has an economically replaceable friction unit.

Other objects and advantages will become apparent from the following detailed description of the invention made in connection with the accompanying drawing in which, Figure 1 is a fragmentary side elevational view partly in section and with parts broken away of a vehicle wheel provided with a brake of the character contemplated by the present invention;

Figure 1:
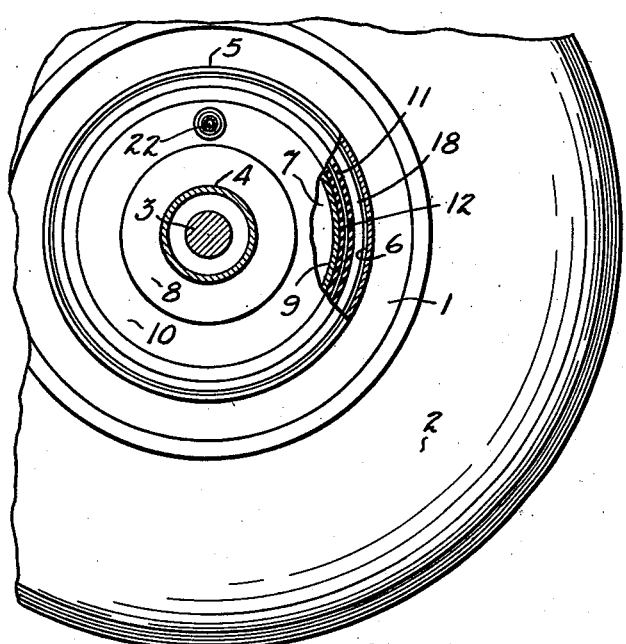
Figure 2:
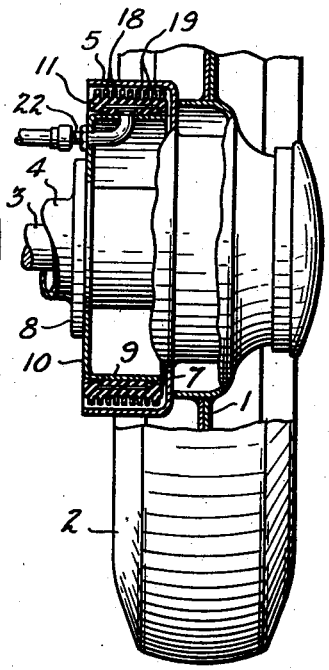
Fig. 2 is a fragmentary front elevational view partly in section and with parts broken away of the wheel and braking device of Fig. 1.

The present invention lies in the particular construction and combination of parts and is related to the invention disclosed in my co-pending application Serial No. 114,792 filed December 8, 1936, now Patent No. 2,180,086, dated Nov. 14, 1939, in which is shown an advantageous use of deformable ribs in connection with frictional devices.

Referring to the drawing by numerals of reference, which indicate like parts throughout the several views, the braking device is illustrated in connection with a vehicle wheel 1 and tire 2 mounted for rotation on shaft 3, which, for example, might be the rear axle of an automotive vehicle. This axle or shaft 3 is carried within a dead axle or housing 4 in accordance with conventional practice, and provided with the usual bearings or bushings. Secured to the wheel 1 is a braking member or drum 5 desirably formed with a smooth internal friction surface 6 directed toward the axle or shaft 3 and concentric with the axis of rotation of the wheel. The braking member 5 may be secured to the wheel 1 in accordance with any usual method of wheel manufacture. For example, an inwardly extending circumferential flange 7 may be formed on the braking member 5 and secured to the wheel 1 by means of bolts or rivets or a welding operation.

The housing 4 is formed with a circumferential flange 8 which carries a cylindrical member 9 positioned within the cylindrical braking member 5 and concentric with the rotational axis of the wheel 1. An inwardly extending flange 10 formed along one edge of the cylindrical member 9 is secured to the circular flange 8 on the housing 4. Thus, the cylindrical member 9 is carried in spaced relation with the braking member 5 and an annular channel is formed between the two members which is substantially uniform and is concentric with the axis of rotation of the wheel.

Figure 3:
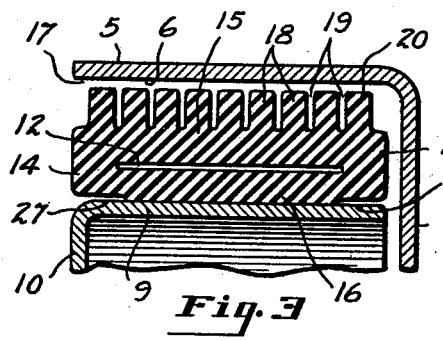
Fig. 3 is a fragmentary detail view in section, illustrating the braking device.

A circular friction element 11 is formed peripherally about the cylindrical member 9 and disposed in the channel between this member and the braking member 5. This friction element is formed of an elastic deformable material such as rubber of the character used in the manufacture of vehicle tires and is bonded by a suitable means such as vulcanization to the cylindrical member 9 to prevent relative movement between the two. If desired, the surface of the member 9 may be roughened or knurled to increase the bond. Extending centrally through the friction element 11 and circumferentially with respect to the cylindrical member 9 is a fluid-tight annular chamber 12. As shown in Fig. 3, the chamber 12 does not have an appreciable volume when the friction element is in its normal position and it is contemplated that the present invention may be embodied in a braking or friction device in which the chamber has substantially no volume whatsoever when the friction element is in its normal position.

The chamber 12 extends across substantially the entire width of the friction element 11 with the exception of the circumferential marginal portions 14 which secure outer portion 15 of the friction element to inner or holding portion 16 thereof.

Figure 4:
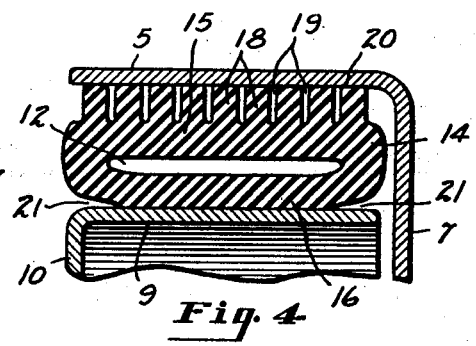
Fig. 4 is a view similar to Fig. 3 showing the device in operative braking position.

In the normal position of the braking device the friction element 11 secured to the cylindrical member 9 does not contact the friction surface 6 of the braking member 5 but is separated therefrom by a circumferentially extending clearance space 17. Upon the application of a fluid pressure within the chamber 12 the friction element 11 is distended or deformed, as illustrated in Fig. 4. This deformation is occasioned by the chamber 12 increasing in volumetric capacity to accommodate the fluid introduced therein under pressure. Accordingly, the outer portion 15 of the friction element moves radially outward and away from the inner portion 16 thereof and increases in circumference, causing it to move into and through the clearance space 17 which, as mentioned above, normally separates the friction element 11 from the friction surface 6 of the braking member 5. Thus the outer face of the friction element engages the friction surface 6 and, due to the inherent properties of the material of which the friction element is formed, relative rotational movement between the friction element and braking member 5 is resisted. Accordingly, this resistance to rotational movement is transmitted through the respective parts of the device and results in a braking action on the rotation of the wheel 1 with respect to the housing 4.

In order to promote a more efficient and desirable braking action and to increase the smoothness of operation of the device, the outer portion 15 of the friction element 11 is formed with a plurality of circumferentially extending, upstanding ribs 18. These ribs are arranged in parallel relation with one another and are individually relatively unstable, each rib being of substantially greater height than width and spaces 19 by which individual ribs are separated being less than the width of the respective ribs. Furthermore, these ribs extend entirely around the circumferential extent of the friction element and are slightly longitudinally extensible so that, in resisting rotational movement between the braking member 5 and the cylindrical member 9, the ribs may be extended longitudinally.

The friction face 20 of the element 11 which is brought into frictional engagement with the surface 6 of the braking member 5 is formed by a plurality of individual edge portions of the ribs 18. During a braking action, although the ribs may individually function to resist relative rotation between the members, they mutually co-operate to the same end and serve to support one another against excessive lateral deflection.

Upon the application of fluid pressure to the chamber 12 in a braking action substantial distortion in the friction element 11 occurs at the marginal portions 14. In order that the resistance to movement of these portions toward the friction surface 6 of the braking member 5 be minimized it is preferable that the margins of the inner portions 16 of the friction element are not secured or bonded to the cylindrical member 9. Thus, upon deformation of the friction element 11 in a braking action, which causes the ribs 18 to engage the friction surface 6 of the braking member 5 as shown in Fig. 4, the marginal portions 14 likewise may move slightly radially away from the cylindrical member 9, and are then separated therefrom by spaces 21.

Figure 5:
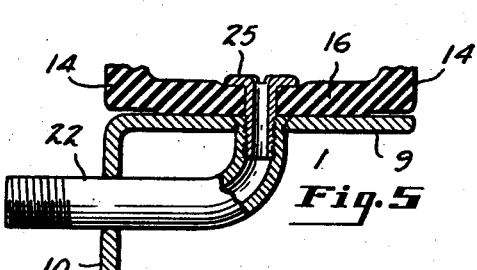
Fig. 5 is a fragmentary detail view in section showing the construction of means for admitting fluid pressure to the chambered frictional element of the brake.

The fluid pressure to cause a braking action may be applied to the chamber 12 in any suitable manner. One method of accomplishing this is illustrated in Fig. 5. An L-shaped conduit 22, preferably formed of metal, has one end pressed through an aperture in the cylindrical member 9 and secured therein by swaging or welding, and the other end extends through an aperture in the flange 10. This latter end may be provided with a suitable fitting (not shown) to secure a pressure line to the conduit 22. A nipple 25 is threadedly received in the end of the conduit 22 secured in the cylindrical member 9 and extends through the inner portion 16 of the friction element 11, terminating within the chamber 12 thereof.

A vehicle equipped with brakes of this character may have all the chambers 12 connected by pressure lines to a common chamber having a source of fluid pressure. Upon the application of fluid pressure to such pressure chamber the fluid pressure is then uniformly distributed into each of the chambers 12 in the various friction or braking devices, thus affording a uniform braking effect in each of the several wheels. The frictional engagement of the various friction elements 11 with their respective braking members 5 is substantially proportional to the fluid pressure in the chambers 12.

Figure 6:
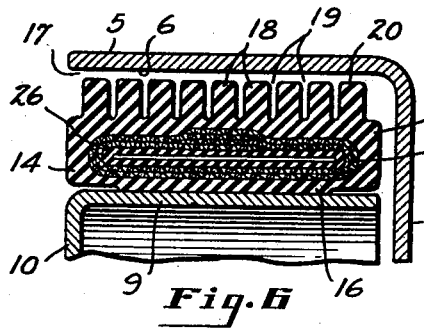
Fig. 6 is a view similar to Fig. 3, illustrating a modified form of friction element.

In Fig. 6 is illustrated a modified method of construction in which the chamber 12 is surrounded by fabric material 26 embedded in the friction element 11 to reinforce it against excessive distension upon the application of high fluid pressures. The cords of the fabric material 26 are preferably arranged to extend diagonally across the friction element 11 so that they do not objectionably interfere with circumferential extension of the outer portion 15. In this modification the ribs 18 are in the form of a continuous helix or spiral extending circumferentially about the deformable friction element. Thus the groove 19 is a continuous helix which extends spirally about the periphery of the friction element substantially from one side to the other thereof.

In commercially manufacturing frictional devices of this character it is contemplated to assemble the cylindrical member 9 having the flange 10 integrally formed therewith and the friction element 11 with its conduit 22 as a single unitary structure. This may be accomplished by securing the conduit 22 in the member 9 and flange 10 as previously described and then building the friction element thereon with the cylindrical member 9 serving as a mandrel. After sufficient of the raw rubber material from which the friction element 11 is to be formed has been applied to the member 9 to form the inner portion 16, the nipple 25 is forced through a small aperture in the rubber and screwed tightly into the end of the conduit 22. A suitable material such as soapstone, paper, or liner stock, to prevent adhesion between the outer portion 15 and inner portion 16 of the friction element during vulcanization, is then applied circumferentially about the inner portion 16. The rubber to form the outer portion 15 is then applied over the antiadhesion material and the assembled friction element is ready for vulcanization, it being understood that the separator or antiadhesion material does not extend the entire width of the friction element but merely is as wide as the desired chamber 12.

Another method of assembling the device is to apply a circumferential band of material of greater width than the friction element 11 about the cylindrical element 9. The antiadhesion material is placed circumferentially about the material directly overlying the cylindrical member 9 and the marginal portions of the material are then folded over the central portion, thus enclosing the antiadhesion material and forming the outer portion 15 of the friction element. The assembled unit thus ready for vulcanization is placed in a heated mold and cured, the vulcanization process serving to securely bond the friction element to the cylindrical member 9, and suitable formations in the interior of the mold serving to make the ribs 18.

Narrow strips of the antiadhesion material or sheet may be first placed circumferentially about marginal portions 27 of the cylindrical member 9 before building the friction element thereon in order to prevent a vulcanization bond between these marginal portions of the member 9 and the friction element so that the marginal portions 18 of the friction element will be unconnected with the member 9 to permit separation thereof upon application of fluid pressure to the chamber 12.

Although the present invention has been described and illustrated in connection with a wheel brake, various adaptations are contemplated. For example, the invention may be adapted to serve as a clutch or a coupling. It is to be understood that various modifications in design and construction of the several parts are contemplated and intended to be included within the scope of the appended claims.

What I claim is:

1. A construction for resisting relative rotational movement of members comprising a friction surface on one of the members, a deformable rubber friction element on a second member, a plurality of protuberances integrally formed on the friction element and directed toward said friction surface, said protuberances normally being spaced from the friction surface to permit relative rotational movement of the members, a fluid receiving chamber formed within the friction element, said chamber extending in substantially parallel relation to said friction surface over an area substantially coextensive with the portions of the friction element having said protuberances formed thereon so as to underlie substantially all portions of the friction element which engage the friction surface, the chamber extending in a direction substantially normal to said friction surface a distance less than the thickness of one wall of the friction element, whereby said chamber normally has a relatively small volumetric capacity and underlies a relatively large area of friction element surface, and means through which fluid can be introduced into the chamber under pressure to deform the friction element and force the protuberances into frictional engagement with the friction surface, said friction element being arranged, upon the release of fluid from the chamber, to return by inherent resiliency to normal position with the integral protuberances withdrawn from the friction surface.

2. A construction for resisting relative rotational movement of members comprising a friction surface on one of the members, a deformable rubber friction element on a second member, a plurality of protuberances integrally formed on the friction element and directed toward said friction surface, said protuberances normally being spaced from said friction surface to permit relative rotational movement of the members, a fluid receiving chamber formed within the friction element, said chamber extending in substantially parallel relation to said friction surface over an area substantially coextensive with the portions of the friction element having said protuberances formed thereon so as to underlie substantially all portions of the friction element which engage the friction surface, the chamber extending in a direction substantially normal to said friction surface a distance less than the thickness of one wall of the friction element, whereby said chamber normally has a relatively small volumetric capacity and underlies a relatively large area of friction element surface, means securing central portions only of the friction element to said second member, leaving marginal portions of the friction element, which are normally disposed closely adjacent the second member, free and unattached for unrestricted movement thereof toward the friction surface simultaneously with the protuberances upon the introduction of fluid under pressure to the chamber, and means through which fluid can be introduced into the chamber under pressure to deform the friction element and force the protuberances into frictional engagement with the friction surface, said friction element being arranged, upon the release of fluid from the chamber, to return by inherent resiliency to normal position with the integral protuberances withdrawn from the friction surface.

3. A construction for resisting relative rotational movement of members comprising a friction surface on one of the members, a deformable rubber friction element on a second member, a plurality of protuberances integrally formed on the friction element and directed toward said friction surface, said protuberances normally being spaced from said friction surface to permit relative rotational movement of the members, a fluid receiving chamber formed within the friction element, said chamber extending in substantially parallel relation to said friction surface over an area substantially coextensive with the portions of the friction element having said protuberances formed thereon so as to underlie substantially all portions of the friction element which engage the friction surface, the chamber extending in a direction substantially normal to said friction surface a distance less than the thickness of one wall of the friction element, whereby said chamber normally has a relatively small volumetric capacity and underlies a relatively large area of friction element surface, fabric material embedded in the rubber of the friction element and embracing the fluid receiving chamber to resist distension of the chamber, said fabric material being separated from the integral protuberances by a continuous cushion of rubber, whereby flexing and distortion of the protuberances during frictional engagement thereof with the friction surface is unimpaired by the reinforcing fabric material, and means through which fluid can be introduced into the chamber under pressure to deform the friction element and force the protuberances into frictional engagement with the friction surface, said friction element being arranged, upon the release of fluid from the chamber, to return by inherent resiliency to normal position with the integral protuberances withdrawn from the friction surface.

4. A construction for resisting relative rotational movement of members comprising a friction surface on one of the members, a deformable rubber friction element on a second member, a plurality of protuberances integrally formed on the friction element and directed toward said friction surface, said protuberances normally being spaced from said friction surface to permit relative rotational movement of the members, a fluid receiving chamber formed within the friction element, said chamber extending in substantially parallel relation to said friction surface over an area substantially coextensive with the portions of the friction element having said protuberances formed thereon so as to underlie substantially all portions of the friction element which engage the friction surface, the chamber extending in a direction substantially normal to said friction surface a distance less than the thickness of one wall of the friction element, whereby said chamber normally has a relatively small volumetric capacity and underlies a relatively large area of friction element surface, fabric material embedded in the rubber of the friction element and embracing the fluid receiving chamber to resist distension of the chamber, said fabric being separated from the integral protuberances by a continuous cushion of rubber, whereby flexing and distortion of the ribs during frictional engagement thereof with the friction surface is unimpaired by the reinforcing fabric material, means securing central portions only of the friction element to said second member, leaving marginal portions of the friction element which are normally disposed closely adjacent the second member free and unattached for unrestricted movement toward the friction surface, simultaneously with the protuberances, upon the introduction of fluid under pressure to the chamber, said reinforcing material extending beyond the central portions of the friction element which are secured to the second member, and being incorporated in the marginal portions of the friction element which move toward the friction surface, so as to reinforce said marginal portions of the friction element and carry a portion of the torque load transmitted from one member to the second member through the deformable friction element, and means through which fluid can be introduced into the chamber under pressure to deform the friction element and force the protuberances into frictional engagement with the friction surface, said friction element being arranged, upon the release of fluid from the chamber, to return by inherent resiliency to normal position with the integral protuberances withdrawn from the friction surface.

5. A construction for resisting relative rotational movement of members comprising a friction surface on one of the members, a deformable rubber friction element on a second member, a plurality of integral protuberances formed on the friction element and directed toward said friction surface, said protuberances normally being spaced from said friction surface to permit relative rotational movement of the members, a fluid receiving chamber formed within the friction element, said chamber extending parallel to said friction surface over an area approximately coextensive with the portions of the friction element having said protuberances formed thereon so as to underlie all portions of the friction element which engage the friction surface, means securing central portions only of the friction element to said second member, leaving marginal portions of the friction element which are normally disposed closely adjacent the second member, free and unattached for unrestricted movement thereof toward the friction surface simultaneously with the protuberances upon the introduction of fluid under pressure to the chamber, and means through which fluid can be introduced into the chamber under pressure to deform the friction element and force the protuberances into frictional engagement with the friction surface, said friction element being arranged, upon the release of fluid from the chamber, to return by inherent resiliency to normal position with the integral protuberances withdrawn from the friction surface.

6. A construction for resisting relative rotational movement of members comprising a friction surface on one of the members, a deformable rubber friction element on a second member, a plurality of protuberances integrally formed on the friction element and directed toward said friction surface, said protuberances normally being spaced from said friction surface to permit relative rotational movement of the members, a fluid receiving chamber formed within the friction element, said chamber extending in substantially parallel relation to said friction surface over an area substantially coextensive with the portions of the friction element having said protuberances formed thereon so as to underlie substantially all portions of the friction element which engage the friction surface, fabric material embedded in the rubber of the friction element and embracing the fluid receiving chamber to resist distension of the chamber, said fabric being separated from the integral protuberances by a continuous cushion of rubber, whereby flexing and distortion of the ribs during frictional engagement thereof with the friction surface is unimpaired by the reinforcing fabric material, means securing central portions only of the friction element to said second member, leaving marginal portions of the friction element which are normally disposed closely adjacent the second member free and unattached for unrestricted movement toward the friction surface, simultaneously with the protuberances, upon the introduction of fluid under pressure to the chamber, said reinforcing material extending beyond the central portions of the friction element which are secured to the second member, and being incorporated in the marginal portions of the friction element which move toward the friction surface, so as to reinforce said marginal portions of the friction element and carry a portion of the torque load transmitted from one member to the second member through the deformable friction element, and means through which fluid can be introduced into the chamber under pressure to deform the friction element and force the protuberances into frictional engagement with the friction surface, said friction element being arranged, upon the release of fluid from the chamber, to return by inherent resiliency to normal position with the integral protuberances withdrawn from the friction surface.

HERMAN T. KRAFT.